United States Patent

Wien

Patent Number: 5,400,544
Date of Patent: Mar. 28, 1995

[54] RAISED GARDEN BED

[76] Inventor: Fredrick Wien, 1309 Dentwood Dr., San Jose, Calif. 95118

[21] Appl. No.: 55,556

[22] Filed: May 3, 1993

[51] Int. Cl.[6] .............................................. A01G 1/00
[52] U.S. Cl. .......................................... 47/33; 47/19; 47/59
[58] Field of Search ...................... 47/19, 64, 59, 59 C, 47/59 CD, 85, 33, 63, 18

[56] References Cited

U.S. PATENT DOCUMENTS

| | | | |
|---|---|---|---|
| 397,732 | 2/1889 | Landis | 47/33 |
| 619,352 | 2/1899 | Schaefer | 47/33 |
| 992,529 | 5/1911 | Abraham | 47/19 |
| 1,508,028 | 9/1924 | Robinson | 47/59 |
| 1,876,571 | 9/1932 | Acuff, Jr. | 47/19 |
| 2,046,236 | 6/1936 | Ball | 47/85 |
| 2,969,185 | 1/1961 | Geiger | 47/48.5 M |
| 3,353,704 | 11/1967 | Belcher et al. | 47/85 |
| 4,065,877 | 1/1978 | Kelley | 47/85 |
| 4,223,840 | 9/1980 | La Scala et al. | 47/48.5 M |
| 4,363,189 | 12/1982 | O'Donnell, III | 47/85 |
| 4,429,489 | 2/1984 | Fischer | 47/19 |
| 4,869,018 | 9/1989 | Scales et al. | 47/33 |

FOREIGN PATENT DOCUMENTS

| | | | |
|---|---|---|---|
| 74684 | 8/1952 | Denmark | 47/19 |
| 168914 | 4/1934 | Switzerland | 47/19 |
| 2230928 | 11/1990 | United Kingdom | 47/33 |

*Primary Examiner*—Ramon S. Britts
*Assistant Examiner*—Joanne C. Downs

[57] ABSTRACT

A new and improved raised garden bed apparatus which is raised above ground level includes a wall assembly that is supported by the ground for defining a raised garden bed. The wall assembly includes at least one plastic wall member. The wall assembly may include a plurality of straight, interconnected plastic wall members that define a rectangular raised garden bed. The plastic wall members are connected together with fasteners which may be screws or complementary hooks and slots. A first trestle member may be supported by the plastic wall members above ground level. A quantity of plant sustaining material may be placed over the first trestle member and be supported thereby. A second trestle member may be placed over the quantity of plant sustaining material, such that the quantity of plant sustaining material is sandwiched between the first trestle member and the second trestle member. The second trestle member is supported by the first trestle member and the plastic wall members above ground level. The first trestle member and the second trestle member may include a plurality of lateral projections. The plastic wall members may include slots and ledges elevated above ground level. The slots receive the lateral projections, and the ledges support the lateral projections of the first trestle member, whereby the first trestle member, the quantity of plant sustaining material, and the second trestle member are elevated above ground level. Air is permitted to circulate under the first trestle member.

17 Claims, 5 Drawing Sheets

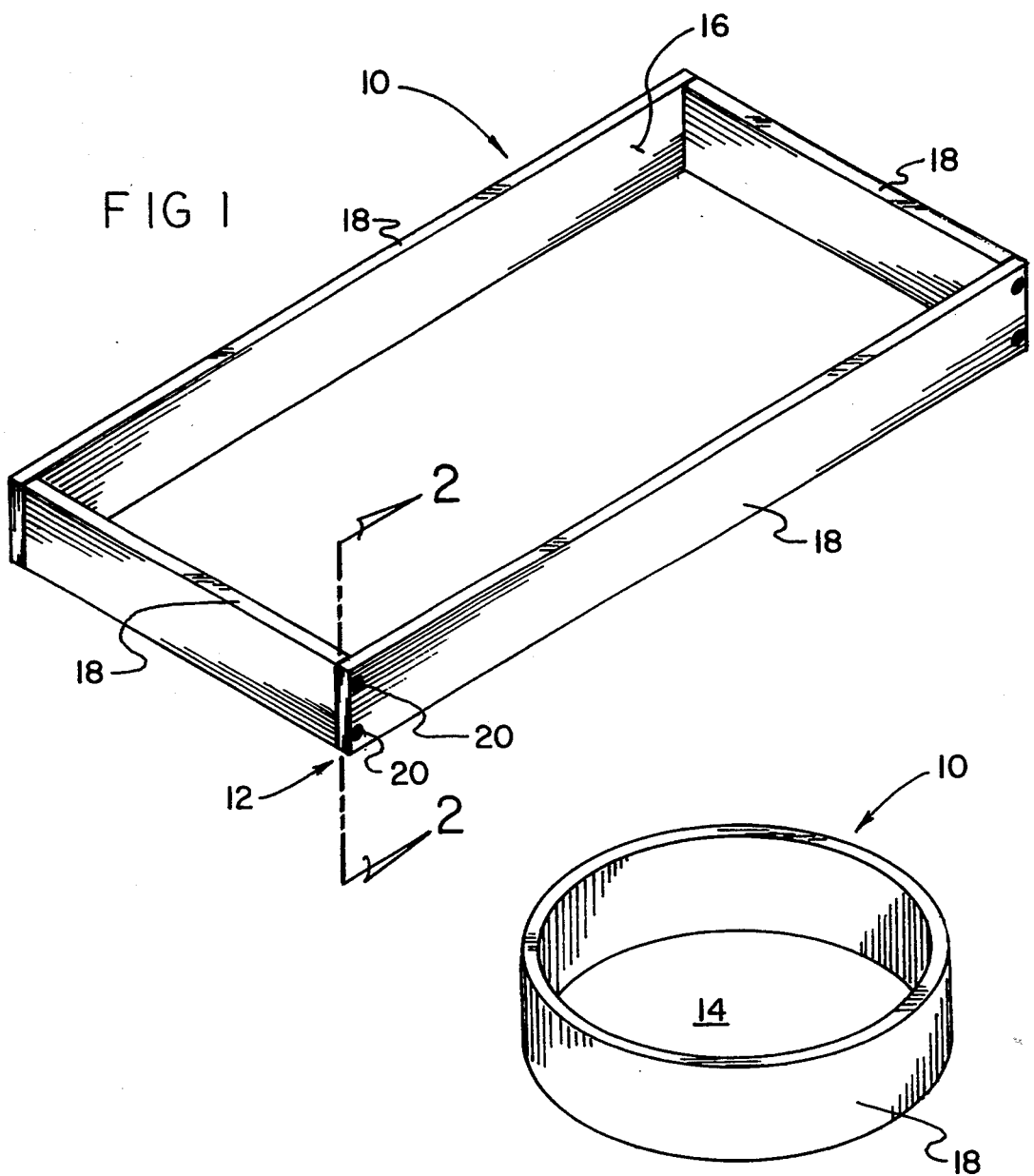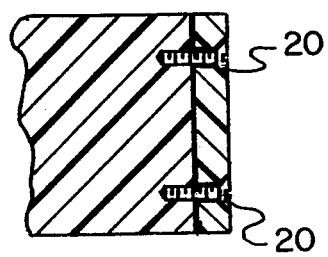

RAISED GARDEN BED

BACKGROUND OF THE INVENTION

Field of the Invention

The present invention relates generally to gardens, and more particularly, to gardens which include a garden bed that includes a portion raised above ground level.

Description of the Prior Art

Gardens that include a garden bed having a portion raised above ground level are well known in the art of gardening. Gardens with raised garden beds generally include wooden boards. However, a number of problems are associated with the use of wooden boards with raised garden beds. Wooden boards are susceptible to internal damage such as caused by wood rot and termites. In this respect, it would be desirable if a raised garden bed were provided that avoided problems of internal damage caused by wood rot and termites.

Another problem associated with the use of wooden boards with raised garden beds is damage or injury experienced by a person assembling the boards. Splinters in a person's skin often result from using wooden boards. Splinters are not only painful and debilitating at the time they occur, but they often result in an infection that can lead to further pain and debilitation. In this respect, it would be desirable if a raised garden bed were provided that precluded the infliction of splinters on a person assembling the wooden boards.

The wood rot and termite problems mentioned above reduce both the structural strength and the longevity of the raised garden bed. In this respect, it would be desirable if a raised garden bed were provided that avoided both the problems related to structural strength and the problems related to longevity that are associated with raised garden beds using wooden boards.

When raised garden beds using wooden boards are assembled, nails and hammering are most often employed. Nails often rust, and hammering often leads to bruised fingers. In this respect, it would be desirable if a raised garden bed apparatus were provided which avoided the use of nails and hammering for assembling boards together.

Soil in gardens, to provide an optimum environment for growing, should be aerated. Conventional methods of aeration require turning the soil over or tilling. Such conventional soil aeration operations require much labor. In this respect, it would be desirable if a raised garden bed apparatus were provided which provided soil aeration without requiring turning the soil over or tilling.

Many crops that are grown in gardens require vertical supports for supporting climbing plants. To supply vertical supports, one often provides sticks or twigs which are not easily supported in the soil. In this respect, it would be desirable if a raised garden bed apparatus were provided which provided vertical supports without using sticks or twigs.

Sticks and twigs that are often used to provide vertical supports for climbing plants are often unattractive to look at and present a highly irregular and unsightly visual appearance. In this respect, it would be desirable if a raised garden bed apparatus were provided and that provided a regular and aesthetically visual appearance for vertical supports for climbing plants.

Raised gardens, like all gardens, require adequate watering. Conventionally, one must employ a hose or water can to water the garden. In contrast, large quantities of land are often provided with irrigation systems for watering the land. Once irrigation systems are installed, only a minimum of time and effort need be expended for conducting watering operations. However, small plots of land, such as often found in raised gardens, do not generally have irrigation systems because of the time and expenses involved in installation. In this respect, it would be desirable if a raised garden bed apparatus were provided which provided the benefits of an irrigation system without time-consuming and expensive irrigation system installation costs.

The following U.S. patents are disclosed in the prior art relating to elevated devices used for growing plants: U.S. Pat. Nos. 4,751,792; 4,803,806; 4,854,075; 4,869,018; and Des. 266,914. More specifically, U.S. Patent No. 4,751,792 discloses a frame that fits over a garden bed. U.S. Pat. No. 4,803,806 discloses a bed for holding a plurality of separate and distinct plant holders. U.S. Pat. N. 4,854,075 discloses a planting tray that has a plurality of curs in a common molded plant tray. U.S. Pat. No. 4,869,018 discloses a raised bed formed a by a plurality of raised modular wall members. The wall members are hollow and have irrigation outlets and received irrgation water. U.S. Pat. No. 266,914 discloses a tray for growing seeklings that has four walls and a floor which appears to have drain holes.

Thus, while the foregoing body of prior art indicates it to be well known to use wooden boards and :irrigation with raised garden beds, the prior art described above does not teach or suggest a raised garden bed apparatus which has the following combination of desirable features: (1) avoids problems of internal damage caused by wood rot and termites; (2) precludes the infliction of splinters on a person assembling the wooden boards; (3) avoids both the problems related to structural strength and the problems related to longevity that are associated with raised garden beds using wooden boards; (4) avoids the use of nails and hammering for assembling boards together; (5) provides soil aeration without requiring turning the soil over or tilling; (6) provides vertical supports without using sticks or twigs; (7) provides a regular and visually aesthetic appearance for vertical supports for climbing plants; and (8) provides the benefits of an irrigation system without time-consuming and expensive irrigation system installation costs. The foregoing desired characteristics are provided by the unique raised garden bed apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved raised garden bed apparatus which is raised above ground level and which includes a wall assembly that is supported by the ground for defining a raised garden bed. The wall assembly includes at least one plastic wall member. The wall assembly may include a plurality of straight, interconnected plastic wall members that define a rectangular raised garden bed. The plastic wall members are connected together with fasteners which may be screws or complementary hooks and slots. A first trestle member may be supported by the plastic wall members above ground level. A quantity of plant sustaining material may be placed over the first trestle member and be supported thereby. A second trestle member may be placed over the quantity of plant sustaining material, such that the quantity of plant sustaining material is sandwiched between the first trestle member and the second trestle member. The second trestle member is supported by the first trestle member and the plastic wall members above ground level. The first trestle member and the second trestle member may include a plurality of lateral projections. The plastic wall members may include slots and ledges elevated above ground level. The slots receive the lateral projections, and the ledges support the lateral projections of the first trestle member, whereby the first trestle member, the quantity of plant sustaining material, and the second trestle member are elevated above ground level. Air is permitted to circulate under the first trestle member.

The notches and the lateral projections permit air to circulate under the first trestle member. The quantity of plant sustaining material may includes peat moss.

At least one plastic wall member may include a water container assembly on an exterior surface of the plastic wall member. The at least one plastic wall member includes a water channel for conveying water from the water container assembly to the quantity of plant sustaining material.

The first trestle member may include a plurality of first apertures. The second trestle member may include a plurality of second apertures. The first apertures and the second apertures are placed in registration when the second trestle member is placed over the first trestle member.

A plurality of stake members are placed through the first apertures and the second apertures when the first apertures and the second apertures are in registration.

Each stake member may include a pointed end that is driven into the ground. A hilt portion prevents the pointed end from penetrating the ground more than a predetermined distance. A vertical riser portion is located above the hilt portion, and a horizontal foliage support member is supported by the vertical riser portion.

An irrigation assembly may be supported by the plastic wall members for providing an overhead supply of water to the raised garden bed. The irrigation assembly may include a valve connected to a water source, and a water conduit assembly for carrying water from the valve to a plurality of elevated nozzles. The plurality of elevated nozzles are connected to the water conduit assembly for supplying water from an overhead location to the raised garden bed. The water conduit assembly may include first and second riser conduits and a horizontal overhead manifold conduit connected between the riser conduits and the plurality of elevated nozzles.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least five preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved raised garden bed apparatus which has all of the advantages of the prior art and none of the disadvantages.

It is another object of the present invention to provide a new and improved raised garden bed apparatus which may be easily and efficiently manufactured and marketed.

It is a further object of the present invention to provide a new and improved raised garden bed apparatus which is of durable and reliable construction.

An even further object of the present invention is to provide a new and improved raised garden bed apparatus which is susceptible of a low cost of manufacture with regard to both materials and labor, and which accordingly is then susceptible of low prices of sale to the consuming public, thereby making such raised garden bed apparatus available to the buying public.

Still yet a further object of the present invention is to provide a new and improved raised garden bed apparatus which avoids problems of internal damage caused by wood rot and termites.

Still another object of the present invention is to provide a new and improved raised garden bed apparatus that precludes the infliction of splinters on a person assembling wooden boards.

Yet another object of the present invention is to provide a new and improved raised garden bed apparatus which avoids both the problems related to deteriorating structural strength and the problems related to reduced longevity that are associated with raised garden beds using wooden boards.

Even another object of the present invention is to provide a new and improved raised garden bed apparatus which avoids the use of nails and hammering for assembling boards together.

Still a further object of the present invention is to provide a new and improved raised garden bed apparatus which provides soil aeration without requiring turning the soil over or tilling.

Yet another object of the present invention is to provide a new and improved raised garden bed apparatus which provides vertical supports for climbing plants without using sticks or twigs.

Still another object of the present invention is to provide a new and improved raised garden bed apparatus that provides a regular and a visually aesthetic appearance for vertical supports for climbing plants.

Yet another object of the present invention is to provide a new and improved raised garden bed apparatus which provides the benefits of an irrigation system without time-consuming and expensive irrigation system installation costs.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a first preferred embodiment of the raised garden bed apparatus of the invention which includes a plurality of straight plastic boards assembled together.

FIG. 2 is a cross-sectional view of a portion of the raised garden bed apparatus shown in FIG. 1 taken along line 2—2 of FIG. 1, showing screws for connecting plastic wall members together.

FIG. 4 is a perspective view of a second embodiment of the raised garden bed apparatus of the invention which employs a continuous circular wall.

DESCRIPTION OF THE PREFERRED EMBODIMENT

With reference to the drawings, a new and improved raised garden bed apparatus embodying the principles and concepts of the present invention will be described.

Figure 3:
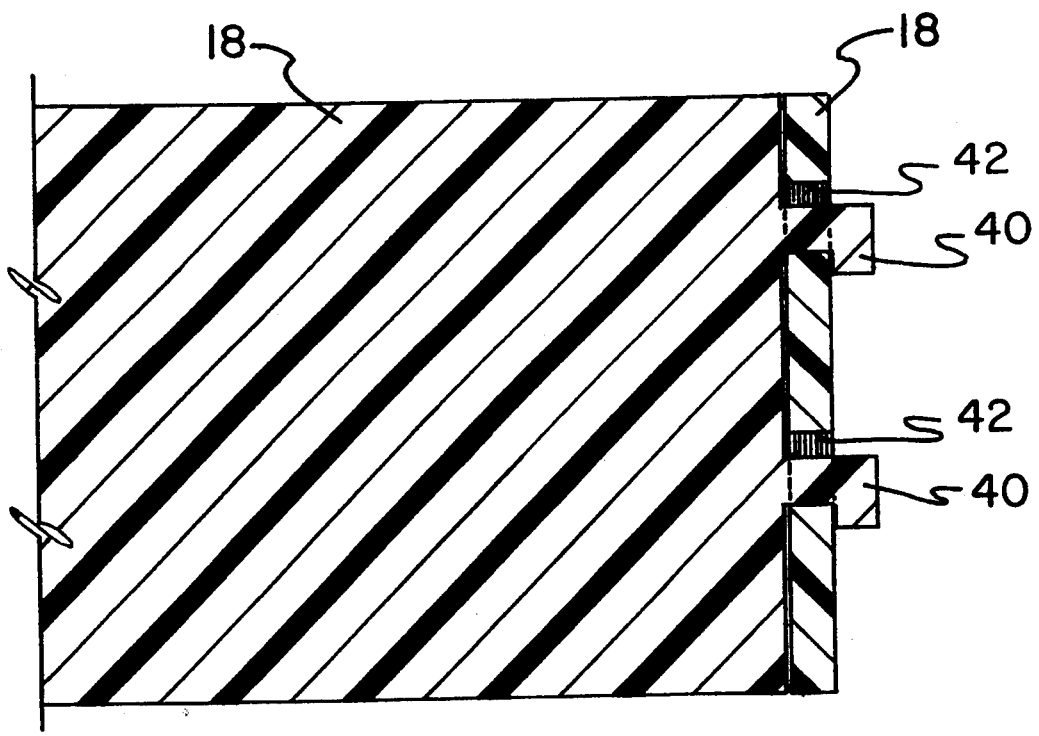
FIG. 3 is a cross-sectional view showing complementary hooks and slots for connecting plastic wall members together.

Turning initially to FIGS. 1–3, there is shown a first exemplary embodiment of the raised garden bed apparatus of the invention generally designated by reference numeral 10. In its preferred form, raised garden bed apparatus 10 includes a wall assembly 12, supported by the ground 14, for defining a raised garden bed 16. The wall assembly 12 includes at least one plastic wall member 18. The wall assembly 12 includes a plurality of straight, interconnected plastic wall members 18 that define a rectangular raised garden bed 16. The plastic wall members 18 are connected together with fasteners 20 such as plastic screws 20. Alternatively, as shown in FIG. 3, the fasteners 20 may include complementary hooks 40 and slots 42.

As shown in FIG. 4, a second embodiment of the raised garden bed apparatus 10 of the invention is shown in which a continuous circular plastic wall member 18 is employed.

Figure 5:
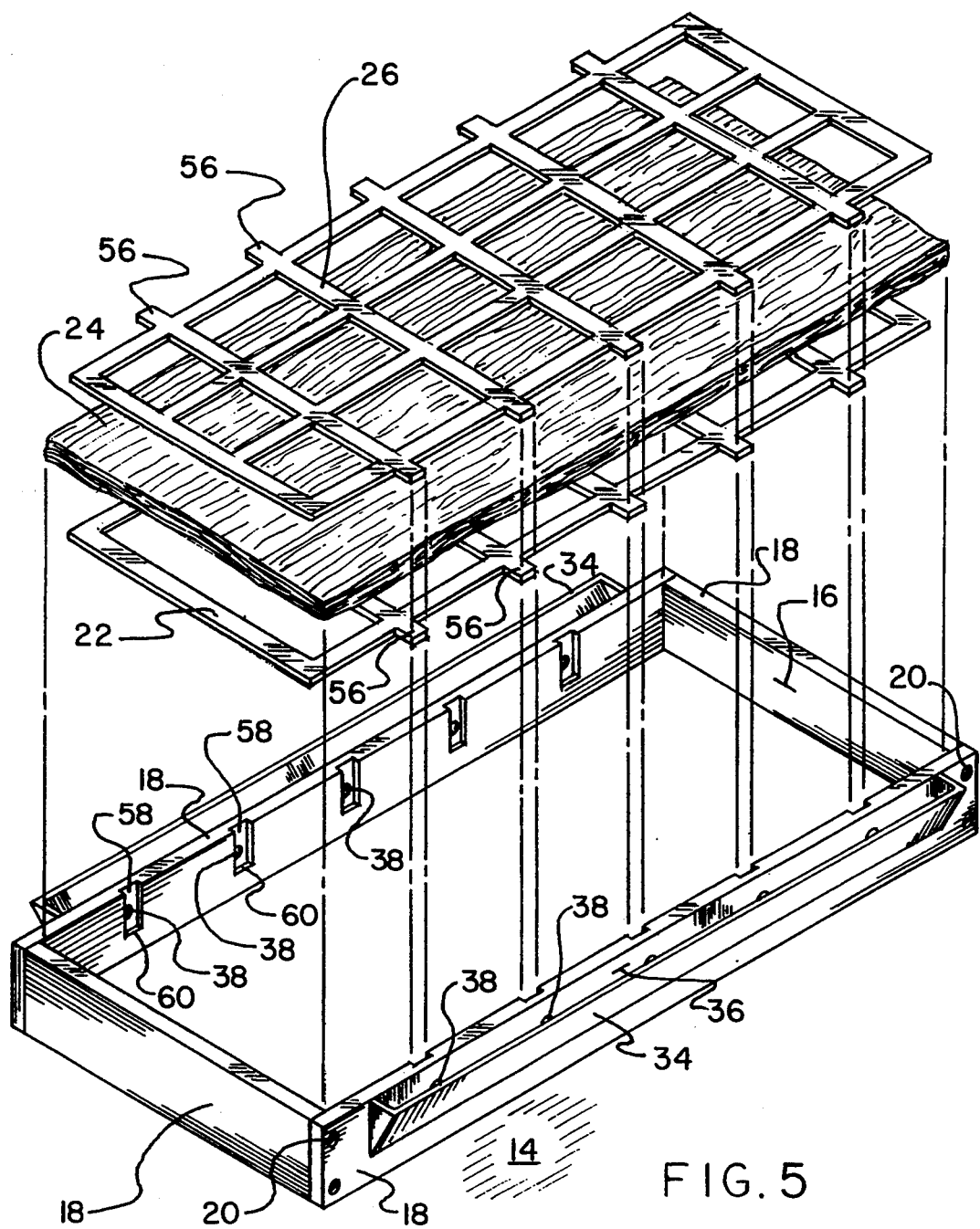
FIG. 5 is an exploded perspective view of a third embodiment of the raised garden bed apparatus of the invention which includes means for permitting aeration without plowing and tilling.

Turning to FIG. 5, a third embodiment of the invention is shown. Reference numerals are shown that correspond to like reference numerals that designate like elements shown in the other figures. In addition, a first trestle member 22 is supported by the plastic wall members 18 above ground level. A quantity of plant sustaining material 24 is placed over the first trestle member 22 and supported thereby. A second trestle member 26 is placed over the quantity of plant sustaining material 24, such that the quantity of plant sustaining material 24 is sandwiched between the first trestle member 22 and the second trestle member 26 and is supported by the first trestle member 22 and the plastic wall members 18 above ground level.

The first trestle member 22 and the second trestle member 26 include a plurality of lateral projections 56. The plastic wall members 18 include slots 58 and ledges 60 elevated above ground level. The slots 58 receive the lateral projections 56. The ledges 60 support the lateral projections 56 of the first trestle member 22, whereby the first trestle member 22, the quantity of plant sustaining material 24, and the second trestle member 26 are elevated above ground level. Moreover, the first trestle member 22, the quantity of plant sustaining material 24, and the second trestle member 26 are supported by the plastic wall members 18, such that air is permitted to circulate under the first trestle member 22. More specifically, the notches 58 and the lateral projections 56 permit air to circulate under the first trestle member 22. The quantity of plant sustaining material 24 may include peat moss.

At least one plastic wall member 18 includes a water container assembly 34 on an exterior surface 36 of the plastic wall member 18. The plastic wall member 18 includes a water channel 38 for conveying water from the water container assembly 34 to the quantity of plant sustaining material 24.

Figure 6:
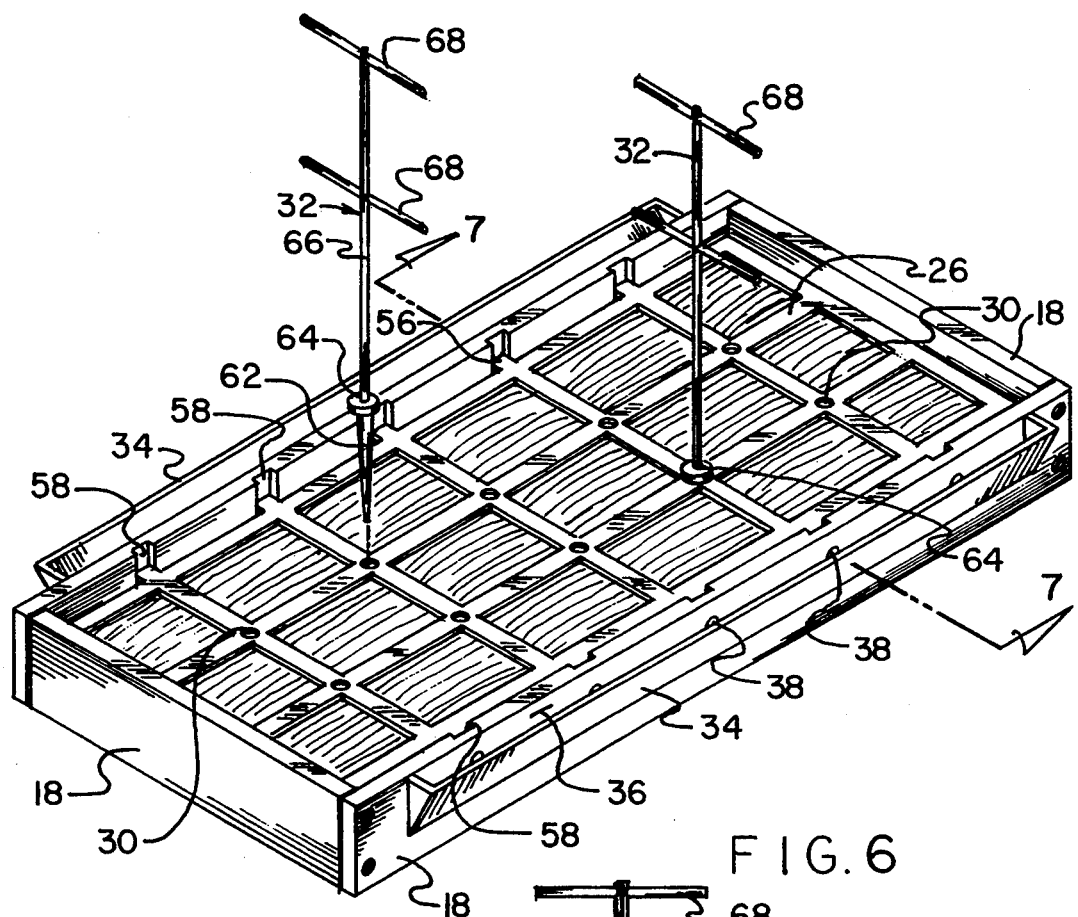
FIG. 6 is a perspective view of a fourth embodiment of the raised garden bed apparatus of the invention which includes a system of vertical stakes.
Figure 7:
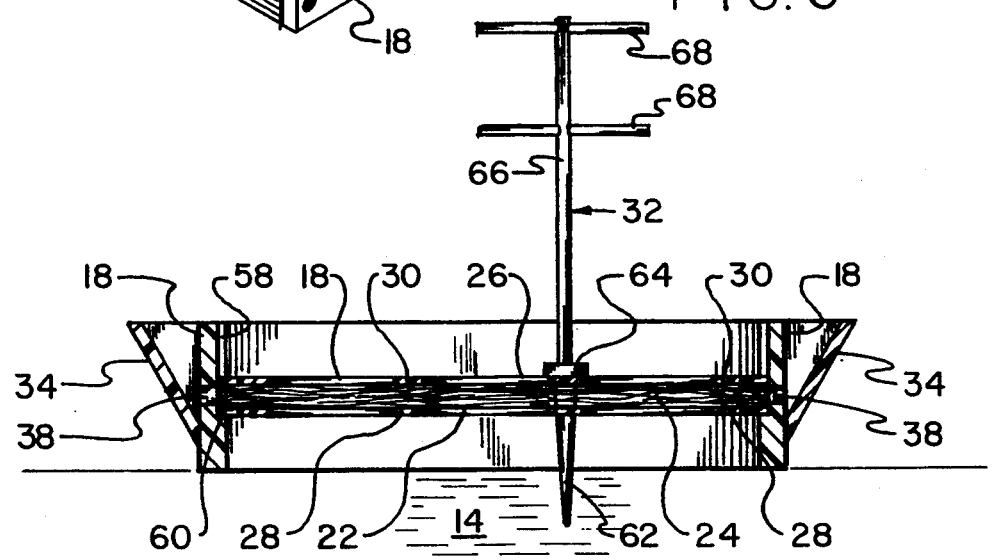
FIG. 7 is a cross-sectional view of the embodiment shown in FIG. 6 taken along the line 7—7 of FIG. 6.

Turning to FIGS. 6–7, a fourth embodiment of the invention is shown. Reference numerals are shown that correspond to like reference numerals that designate like elements shown in the other figures. In addition, the first trestle member 22 includes a plurality of first apertures 28, and the second trestle member 26 includes a plurality of second apertures 30. The first apertures 28 and the second apertures 30 are placed in registration when the second trestle member 26 is placed over the first trestle member 22. A plurality of stake members 32 are placed through the first apertures 28 and the second apertures 30 when the first apertures 28 and the second apertures 30 are in registration.

A stake member 32 includes a pointed end 62 that is driven into the ground 14, a hilt portion 64 which prevents the pointed end 62 from penetrating the ground 14 more than a predetermined distance, a vertical riser portion 66 located above the hilt portion 64, and a horizontal foliage support member 68.

Figure 8:
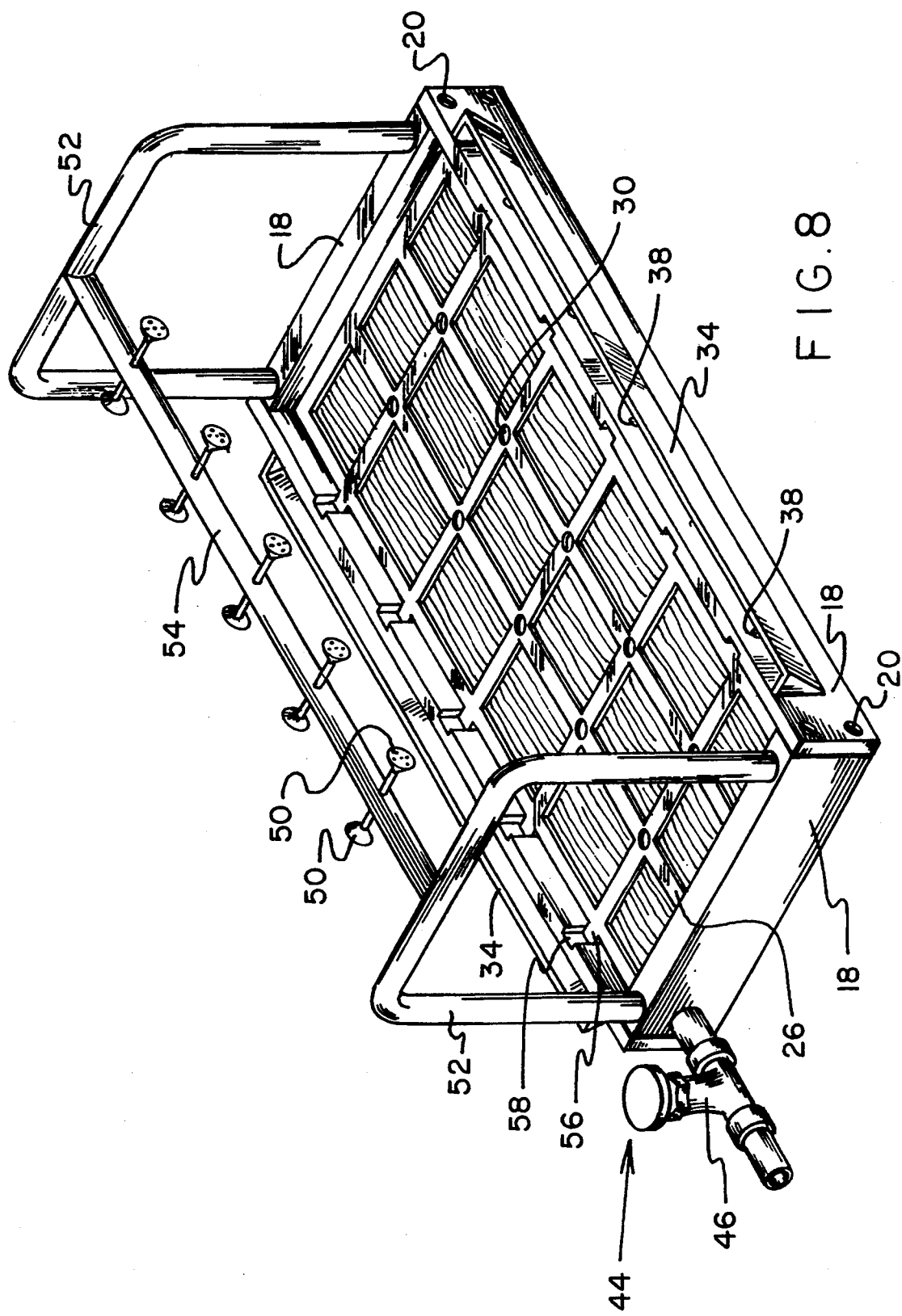
FIG. 8 is a perspective view of a fifth embodiment of the raised garden bed apparatus of the invention which includes an irrigation apparatus.

Turning to FIG. 8, a fifth embodiment of the invention is shown. Reference numerals are shown that correspond to like reference numerals that designate like elements shown in the other figures. In addition, irrigation assembly 44 is supported by the plastic wall members 18 for providing an overhead supply of water to the raised garden bed 16. The irrigation assembly 44 includes a valve 46 connected to a water source. A water conduit assembly carries water from the valve 46 to a plurality of elevated nozzles 50. A plurality of elevated nozzles 50 are connected to the water conduit assembly for supplying water from an overhead location to the raised garden bed 16. More specifically, the water conduit assembly includes first and second riser conduits 52. A horizontal overhead manifold conduit 54 is connected between the riser conduits and the plurality of elevated nozzles 50.

The components of the raised garden bed apparatus of the invention can be made from inexpensive and durable plastic materials.

It is apparent from the above that the present invention accomplishes all of the objects set forth by providing a new and improved raised garden bed apparatus that is low in cost, relatively simple in design and operation, and which may advantageously be used to avoid problems of internal damage to wooden boards caused by wood rot and termites. With the invention, the infliction of splinters on a person assembling wooden boards is precluded. With the invention, both the problems related to reduced structural strength and the problems related to reduced longevity that are associated with raised garden beds using wooden boards are avoided. With the invention, the use of nails and hammering for assembling wooden boards together is avoided. With the invention, soil aeration is provided without requiring turning the soil over or tilling. With the invention, vertical supports are provided without using sticks or twigs. With the invention, a regular and visually aesthetic appearance is provided for vertical supports for climbing plants. With the invention, the benefits of an irrigation system are provided without time-consuming and expensive irrigation system installation costs.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved raised garden bed apparatus which is raised above ground level, comprising:
wall assembly means, supported by the ground, for defining a raised garden bed, said wall assembly means including at least one plastic wall member, further including:
a first trestle member supported by said at least one plastic wall member above ground level,
a quantity of plant sustaining material placed over said first trestle member and supported thereby,
a second trestle member placed over said quantity of plant sustaining material, such that said quantity of plant sustaining material is sandwiched between said first trestle member and said second trestle member and is supported by said first trestle member and said at least one plastic wall member above ground level.

2. The apparatus described in claim 1 wherein said wall assembly means include a plurality of straight, interconnected plastic wall members that define a rectangular raised garden bed.

3. The apparatus described in claim 2 wherein said plastic wall members are connected together with fasteners.

4. The apparatus described in claim 3 wherein said fasteners include screws.

5. The apparatus described in claim 3 wherein said fasteners include complementary hooks and slots.

6. The apparatus described in claim 3 wherein said fasteners are made of plastic.

7. The apparatus described in claim 1 wherein:
said first trestle member and said second trestle member include a plurality of lateral projections,
said at least one plastic wall member includes slots and ledges elevated above ground level, said slots for receiving said lateral projections, and said ledges for supporting said lateral projections of said first trestle member, whereby said first trestle member, said quantity of plant sustaining material, and said second trestle member are elevated above ground level.

8. The apparatus described in claim 1 wherein said first trestle member, said quantity of plant sustaining material, and said second trestle member are supported by said at least one plastic wall member, such that air is permitted to circulate under said first trestle member.

9. The apparatus described in claim 7 wherein said notches and said lateral projections permit air to circulate under said first trestle member.

10. The apparatus described in claim 1 wherein said quantity of plant sustaining material includes peat moss.

11. The apparatus described in claim 1 wherein:
said at least one plastic wall member includes a water container assembly on an exterior surface of said plastic wall member, and
said at least one plastic wall member includes a water channel for conveying water from said water container assembly to said quantity of plant sustaining material.

12. The apparatus described in claim 1 wherein:
said first trestle member includes a plurality of first apertures,
said second trestle member includes a plurality of second apertures, and
said first apertures and said second apertures are placed in registration when said second trestle member is placed over said first trestle member.

13. The apparatus described in claim 1, further including:
a plurality of stake members placed through said first apertures and said second apertures when said first apertures and said second apertures are in registration.

14. The apparatus described in claim 13 wherein one of said stake members includes:
- a pointed end that is driven into the ground,
- a hilt portion which prevents said pointed end from penetrating the ground more than a predetermined distance,
- a vertical riser portion located above said hilt portion, and
- a horizontal foliage support member.

15. The apparatus described in claim 1, further including:
- irrigation assembly means supported by said at least one plastic wall member for providing an overhead supply of water to said raised garden bed.

16. The apparatus described in claim 15 wherein said irrigation assembly means include:
- a valve connected to a water source,
- water conduit assembly means for carrying water from said valve to a plurality of elevated nozzles,
- a plurality of elevated nozzles, connected to said water conduit assembly means, for supplying water from an overhead location to said raised garden bed.

17. The apparatus described in claim 16 wherein:
- said water conduit assembly means include first and second riser conduits,
- a horizontal overhead manifold conduit connected between said riser conduits and said plurality of elevated nozzles.

* * * * *